United States Patent
Weih et al.

(10) Patent No.: US 12,466,123 B2
(45) Date of Patent: Nov. 11, 2025

(54) RIEBER SEALING SYSTEM WITH PLASTIC RETAINER RING

(71) Applicant: S&B Technical Products, Inc., Fort Worth, TX (US)

(72) Inventors: Mark A. Weih, San Jose (CR); Guido Quesada, Santa Ana (CR)

(73) Assignee: S&B Technical Products, Inc., Fort Worth, TX (US)

( * ) Notice: Subject to any disclaimer, the term of this patent is extended or adjusted under 35 U.S.C. 154(b) by 330 days.

(21) Appl. No.: 18/337,212

(22) Filed: Jun. 19, 2023

(65) Prior Publication Data

US 2023/0415402 A1 Dec. 28, 2023

Related U.S. Application Data

(60) Provisional application No. 63/354,747, filed on Jun. 23, 2022.

(51) Int. Cl.
 *B29C 57/02* (2006.01)
 *F16L 21/03* (2006.01)

(52) U.S. Cl.
 CPC ............ B29C 57/025 (2013.01); F16L 21/03 (2013.01)

(58) Field of Classification Search
 CPC ................................ B29C 57/025; F16L 21/03
 See application file for complete search history.

(56) References Cited

U.S. PATENT DOCUMENTS

| | | | | |
|---|---|---|---|---|
| 4,625,383 A * | 12/1986 | Vassallo | ................ | B29C 57/025 29/445 |
| 4,693,483 A * | 9/1987 | Valls | ...................... | F16L 47/10 285/379 |
| 4,826,028 A * | 5/1989 | Vassallo | .................. | F16L 21/03 285/379 |
| 6,142,484 A * | 11/2000 | Valls, Jr. | ................ | F16L 17/025 277/936 |
| 8,709,318 B2 * | 4/2014 | Monteil | ................ | B29C 57/025 264/237 |
| 10,288,199 B2 * | 5/2019 | Copeland | ............... | B21D 39/04 |
| 10,596,751 B1 * | 3/2020 | Copeland | ............... | B29C 57/06 |
| 2006/0082147 A1 * | 4/2006 | Corbett, Jr. | ............. | F16L 21/03 285/307 |
| 2007/0290455 A1 * | 12/2007 | Knapp | ................ | B29C 45/1676 277/627 |
| 2010/0059940 A1 * | 3/2010 | Monteil | .................. | F16L 21/03 277/627 |
| 2010/0264645 A1 * | 10/2010 | Jones | .................. | F16L 37/0925 29/447 |
| 2014/0374995 A1 * | 12/2014 | Monteil | ................ | F16J 15/104 277/626 |
| 2016/0223109 A1 * | 8/2016 | Lopez-Chaves | ........ | F16L 21/03 |
| 2018/0245727 A1 * | 8/2018 | Quesada | ............. | F16J 15/0818 |

* cited by examiner

*Primary Examiner* — Seyed Masoud Malekzadeh
(74) *Attorney, Agent, or Firm* — Whitaker Chalk Swindle & Schwartz PLLC; Charles D. Gunter, Jr.; J. Miguel Hernandez

(57) ABSTRACT

A pipe belling process where a heated thermoplastic pipe end is forced over a sealing gasket on a forming mandrel, with the pipe being subsequently cooled to retain the gasket in an internal groove simultaneously formed in the pipe end. The sealing gasket is a two-component gasket with an elastic component and a plastic component. The elastic component is stretched over a portion of the plastic component during assembly with the plastic component acting as a belling ramp for the gasket during the subsequent pipe belling operation.

16 Claims, 13 Drawing Sheets

RIEBER SEALING SYSTEM WITH PLASTIC RETAINER RING

CROSS-REFERENCE TO RELATED APPLICATIONS

The present application claims benefit of U.S. Provisional Patent Application Ser. No. 63/354,747, filed Jun. 23, 2022, the contents of which are incorporated herein in their entireties for all purposes.

BACKGROUND OF THE INVENTION

1. Field of the Invention

The present invention relates generally to sealing gaskets and sealing systems used in plastic pipelines in which a male spigot pipe section is installed within a mating female socket pipe section to form a pipe joint and, more specifically, to an improved sealing gasket having a specialized retainer ring, as well as a method of installation.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed using a collapsible mandrel belling tool at the pipe manufacturing facility. Various attempts have been made in an attempt to ensure the integrity of such pipe joints. For example, one approach to the problem included the use of a homogeneous rubber ring with a stiffening band which was inserted into a mating groove provided on the internal diameter of the rubber ring.

In the early 1970's, a new technology was developed by Gunnar Parmann of Rieber & Son of Bergen, Norway, referred to in the industry as the "Rieber Joint." The Rieber system employed a combined mold element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos. 4,120,521; 4,061,459; 4,030,872; 3,965,715; 3,929,958; 3,887,992; 3,884,612; and 3,776,682.

Thus, in the Rieber process, the sealing gasket is installed upon the working surface of a forming mandrel and abuts a backup collar which helps to position and retain the gasket during the subsequent belling operation. The associated thermoplastic pipe was then heated and the heated thermoplastic pipe end was forced over the mandrel and gasket. The pipe socket end was deformed by the gasket and an internal retention groove was formed in the interior of the female, socket pipe end. The pipe end was then cooled so that it would retain its shape and the mandrel was retracted, leaving the sealing gasket fixed within the retention groove.

In the Rieber process, the gasket always included an internal metal reinforcing component which circumscribed the gasket body and gave it additional rigidity. The metal component, either a band or wire, was bonded to the rubber and acted as the structural member to keep the gasket engaged in the pipe socket after the belling operation was complete. One disadvantage of the Rieber design with metal inserts is the risk of corrosion of the metal inserts. In the current versions of the Rieber gasket, the metal rings or bands are almost completely embedded in the rubber. However, pins are necessary to hold the rings or bands in the mold. This leaves holes in the seal that expose the metal. The holes can also interfere with sealing if the pins are located near critical regions, which limits the options to hold the metal inserts in place.

U.S. Pat. No. 6,044,539, issued Apr. 4, 2000, to Guzowski, and commonly owned by the present Applicant describes a machine for inserting a "snap-fit" gasket, unable to accept inverse curvature, having an embedded reinforcing ring into a preformed gasket receiving groove in a belled pipe end. However, such a machine was fairly costly to construct and presented difficulties in being hand carried by a worker in the field.

U.S. Pat. No. 10,107,427, issued Oct. 23, 2018, to Monteil, and assigned to the present Applicant, describes a two-component gasket that is designed to be installed in a raceway provided within a socket end of a female bell plastic pipe end. The raceway in the female bell plastic pipe end is preformed during manufacture and the gasket is installed thereafter. The gasket has a rubber body portion which is reinforced by a hard plastic band formed as a series of integral, spaced wedges which are interconnected by a flexible ribbon. The gasket is not used in a Rieber type manufacturing process, however, where the gasket raceway is formed over the gasket as a part of the pipe manufacturing operation.

Other commercial gaskets available in the industry, for example the Forsheda POWER LOCK® and the Vassallo EPSMI®, did not utilize a bonded metal component, but instead used a hard polymer component for the trailing region (ramp). The hard polymer component acted in the same structural manner as the metal component in the original Rieber belling operation. Each of these gaskets had a first distinct body region formed of an elastically yieldable sealing material, such as rubber, bonded or glued to a second distinct body region formed of a more rigid material, such as a rigid plastic. Because the parts were bonded together during molding, it was necessary that compatible materials be selected for the rubber and plastic parts allowing mechanical interdiffusion of two dissimilar materials, limiting the range of acceptable materials. Also, the parts could break apart in some circumstances, either during belling or during field installation particularly in cold weather and use due to failure of the mechanical bonding. Thus, despite the advances offered by the Rieber process, there continues to be room for improvements in the belling operation.

It is therefore an object of the present invention to provide a sealing gasket which is suitable for use as a combined mold element and sealing ring in a traditional Rieber pipe belling process which overcomes certain of the previously mentioned shortcomings of existing technology.

Thus, one object of the invention is to provide such a sealing gasket which, because of its composite construction, would eliminate the need for an internal metal reinforcing ring, thereby reducing the cost of the gasket and simplifying the belling operation and improving the cycle time of the manufacturing operation.

Another object of the invention is to provide such a composite sealing gasket with an elastic portion and a harder plastic portion which serves as a reinforced region which helps to ensure that the gasket is not displaced during field installation, storage or transport and which serves as a reinforced contact point during belling operations.

Another object of the invention is to provide such a gasket design which does not require bonding between the plastic and the elastic portions of the gasket, so various combinations of elastic and plastic materials can be used.

Another object is to provide a manufacturing method for such a gasket in which the plastic and elastic components are molded separately, and then assembled, so that the plastic component doesn't need to be an expensive, high temperature resistant formulation.

Another object is to provide such a manufacturing method in which the elastic portion is assembled over at least a portion of the plastic with moderate stretch on the elastic for stability.

Another object is to provide such a manufacturing method where, in addition to stretching the elastic/rubber portion over the plastic component that the elastic/rubber be squeezed laterally in the channel over the plastic component, to provide lateral compression or interference.

Another object is to produce such a an improved gasket in which the two components of the gasket can be taken apart and reassembled, in case there is a need to exchange plastic or elastic materials, as where soils are contaminated and the elastic portion needs to be replaced with a more fluid resistant material, such as a more oil and gas resistant elastomer.

Another object is to allow recyclability of the elastic/plastic gasket. Current production plants scrap a percentage of the pipe bells, and the gasket in the pipe belled end is not always removed before recycling the pipe. A metal band or ring containing gasket can severely damage pipe recycling equipment.

A need also exists for such a sealing gasket which would be simple in design and simple to manufacture and which could also be used without the necessity of modifying the design of existing belling machines.

Additional objects, features and advantages will be apparent in the written description which follows.

SUMMARY OF THE INVENTION

The concept is an improvement over the traditional "Rieber" pipe belling and sealing system for PVC pipe, where the traditional steel retainer ring in the gasket is replaced by a plastic part. The design doesn't require bonding between the plastic and rubber/elastic part of the gasket, so various combinations of elastic and plastic materials can be used. The two parts are molded separately, then assembled, so that the plastic doesn't need to be an expensive high temperature resistant formulation. The two components can be taken apart and reassembled, in case there is a need to exchange plastic or elastic materials. So, both rigid and flexible thermoplastics can be used, which are not restricted to simple polyolefins, or expensive engineering thermoplastics.

In the assembly, the elastic component is stretched over at least a portion of the plastic component, with moderate stretch on the elastic component for stability. A portion of the elastic component fits in a channel formed in the plastic component so that the rubber is squeezed laterally to produce lateral interference or compression of the rubber.

More specifically, a method of installing a gasket in a socket end of a female thermoplastic pipe is shown where the socket end is sized to matingly engage a spigot end of a mating male thermoplastic pipe to form a pipeline. The method includes the steps of:

providing a forming mandrel having an inner end and an outer end and having an outer working surface;

installing a sealing gasket at a first circumferential location on the outer working surface;

heating a socket end of the female thermoplastic pipe;

forcing the heated socket end of the female thermoplastic pipe over the working surface of the mandrel and over the sealing gasket, whereby the heated socket end of the thermoplastic pipe flows over the sealing gasket to form a retention groove for retaining the sealing gasket;

allowing the heated socket end of the thermoplastic pipe to cool;

retracting the cooled socket end of the thermoplastic pipe and the retained sealing gasket from the working surface of the mandrel;

wherein the sealing gasket is a two component gasket having an elastic circumferential component and a plastic circumferential component, the two components being molded separately and then assembled together by stretching the elastic component over at least a portion of the plastic component, prior to installing the sealing gasket on the forming mandrel; and wherein the plastic component of the sealing gasket acts as a belling ramp for the female thermoplastic pipe as the female thermoplastic pipe is forced over the working surface of the mandrel and over the sealing gasket.

Preferably, the elastic portion of the two component gasket is formed of a relatively low durometer rubber selected from the group consisting of natural and synthetic rubbers, such as styrene butadiene rubber, EPDM, nitrile, or Viton elastomers or Therplastic Elastomers (TPE's) or Thermoplastic Vulcanizates (TPV's). The plastic portion of the gasket can be formed of a polyolefin, such as polyethylene or a polypropylene such as glass-filled polypropylene, Polyethylene Terephthalate (PET), glass filled PET, Polyamides, glass filled Polyamides, Poly butylene Terephthalate (PBT), glass filled PBTm or any suitable thermoplastic that meets rigidity and strength minimums, or regrind material of the same thermoplastics.

The elastic portion of the gasket is preferably formed with an outer circumferential region which forms a seal with the groove provided in the female thermoplastic pipe and a downwardly extending lip region which forms a seal with the mating male thermoplastic pipe. The plastic portion of the gasket has a trailing external raceway which circumscribes the plastic portion and which is designed to receive a portion of the elastic component when the elastic and plastic portions are assembled to form the sealing gasket. In this way, the elastic portion of the sealing gasket can be stretch-fit over the plastic portion without bonding or gluing, the plastic portion eliminating the need for an internal metal reinforcing band within the sealing gasket for belling purposes.

Additional objects, features and advantages will be apparent in the written description which follows.

DETAILED DESCRIPTION OF THE INVENTION

The present invention provides a Rieber sealing system which meets the foregoing described objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

In order to fully appreciate the advantages provided by the pipe gasket and sealing system of the invention, reference must first be had the prior art "Rieber" manufacturing process. As explained in the Background discussion, the "Rieber" pipe gasket sealing system has been in commercial use in the United States and other countries since at least the 1970's. Those skilled in this area of the thermoplastic pipe sealing arts will be well familiar with the Rieber system and its use in the municipal waterworks industry, as well as other uses. Turning first to FIGS. 3-6, the Rieber process is illustrated showing the installation of a prior art compression seal gasket within the groove provided within the socket end of the female pipe section.

Figure 3:
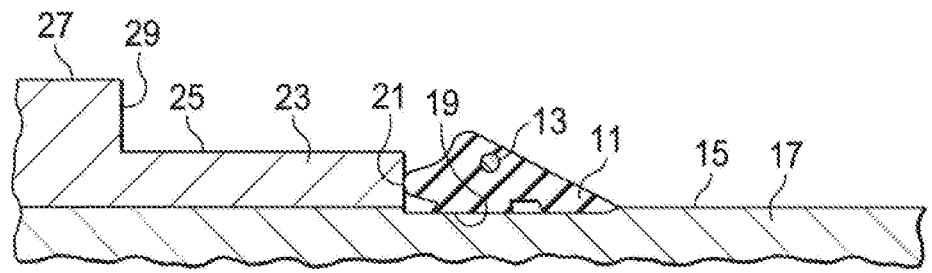
FIGS. 3-6 are simplified, schematic views of the steps involved in the prior art Rieber pipe belling process.
Figure 4:
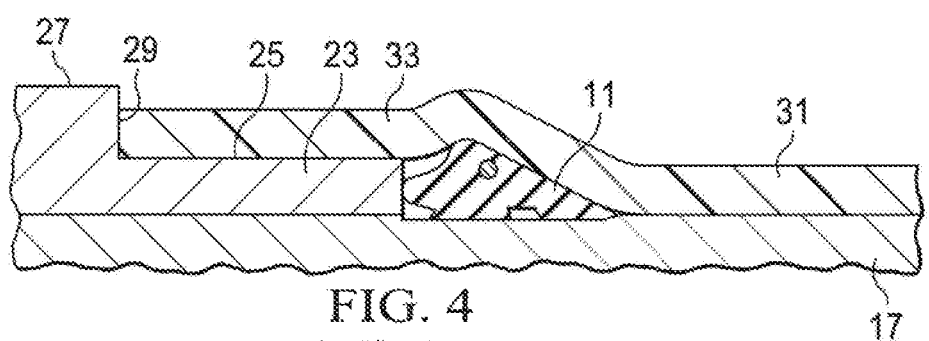
Figure 5:
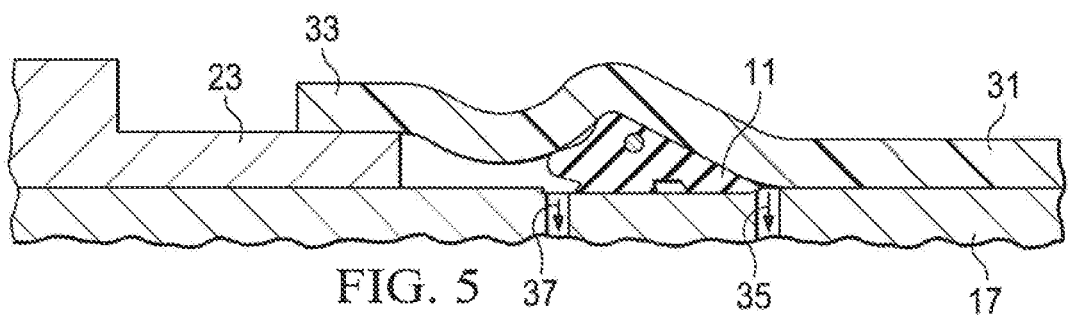
Figure 6:
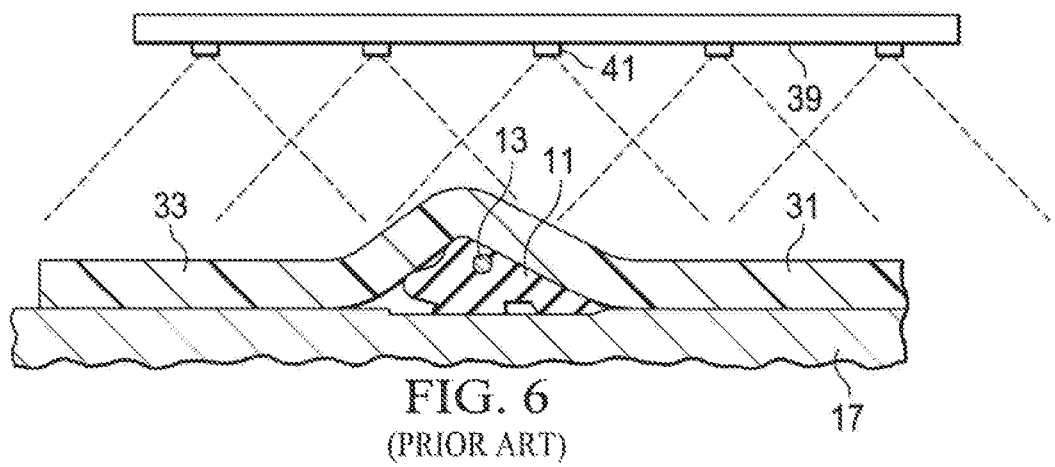

FIG. 3 shows an elastomeric sealing gasket 11 having an internal reinforcing ring 13, the gasket being shown installed in the generally cylindrical outer working surface 15 of the mandrel 17 used in the belling process. The elastomeric gasket 11 can be formed of, for example, a natural or synthetic rubber and is a ring shaped, circumferential member having a lower compression region 19 and an exposed nose portion 21 which, as shown in FIG. 3, abuts a back-up or forming collar 23. The forming collar 23 has a first generally cylindrical extent 25 which is a joined to a second cylindrical extent 27 by a step region 29, whereby the first extent 27 is of greater external diameter than the first cylindrical extent 25, as shown in FIG. 3.

In the prior art technique, the reinforced gasket 11 is placed onto the working surface of the mandrel 17 and is pushed to a position against the back-up or forming collar 23. In this position, the gasket is firmly anchored to the mandrel surface.

In the second step (FIG. 4) of the process, the socket end 33 of a thermoplastic pipe 31 is heated and pushed over the steel mandrel 17, gasket 11 and back-up collar 23. The socket end is expanded due to the thermoplastic nature of the pipe. A number of thermoplastic materials, such as polyethylene, polypropylene and polyvinyl chloride (PVC) are known in the prior art having the required expansion characteristics, depending upon the end application of the pipe joint. A preferred material is PVC.

The socket end 33 flows over the first cylindrical extent 25 of the back-up collar 23 and abuts the step region 29 in the second step of the process. In the next step of the process (FIG. 5) the mandrel and pipe move away from the back-up collar 23 and the pipe socket end 33 retracts around the mandrel and gasket 11 due to the elastic forces of the thermoplastic material. Typically, vacuum was also supplied through ports 35, 37 which connected the mandrel working surface with a vacuum source (not shown).

In the last step of the process (FIG. 6) the pipe socket end 33 is allowed to cool or may have supplemental cooling, as by means of a water spray bar 39 and spray nozzles 41, or by air or other means. As the cooling takes place, the pipe socket end 33 shrinks around the gasket 11, thus compressing the rubber body of the gasket between the steel reinforcing ring 13 and the socket-groove to establish a firm seal. Since the gasket is sealed against the socket under controlled conditions at the factory, the possibility that sand or similar contaminants would penetrate the crucial sealing zone of the gasket was greatly reduced. The reinforcing metal ring 13, in addition to providing the required rigidity during the manufacturing process described, also functions as a retainer to insure that the gasket is not displaced from the groove (43 in FIG. 7) during transport, installation, or in use.

Figure 1:
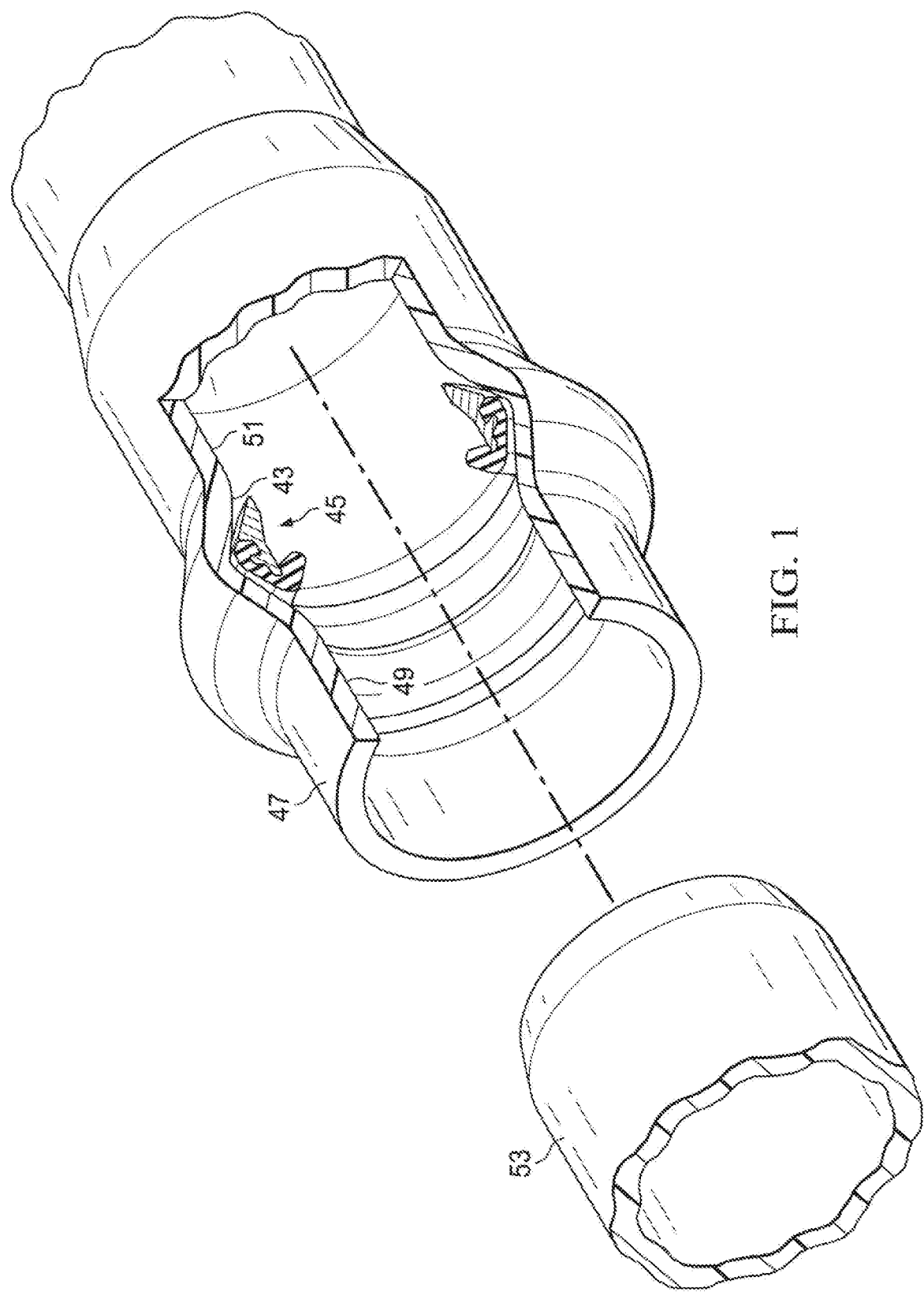
FIG. 1 is a perspective view, partly broken away, of the assembly of a plastic pipe joint where the male spigot pipe end is about to be inserted into the mating female, belled pipe end, the pipe gasket of the invention being shown in a groove in the interior of the belled pipe end.

FIG. 1 shows a sealing gasket of the invention, designated generally as 45 which is installed within a groove 43 provided within the socket end 47 of the illustrated thermoplastic pipe. The internal annular groove 43 of the socket end 47 is located between internal cylindrical surfaces 49, 51 of substantially equal diameter. The socket end 47 is intended to be made-up to form a pipe joint with the mating male or spigot pipe section 53 which is inserted within the socket end 47.

Figure 2:
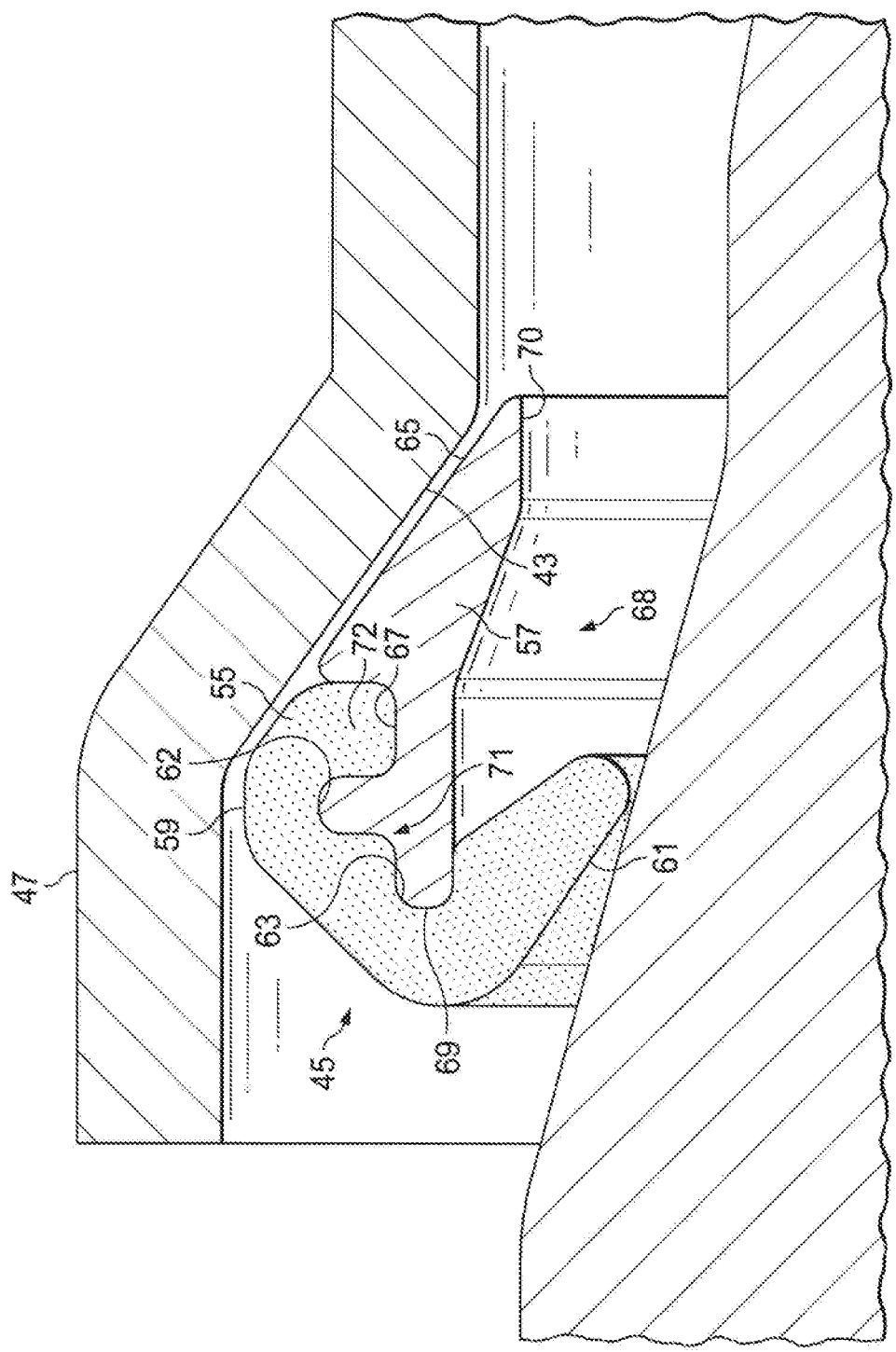
FIG. 2 is a side, partial sectional view of the new gasket of the invention during the initial condition of the pipe belling operation with the gasket in a relaxed state.

A particularly preferred form of the first version of the gasket 11 which can be used in the method of the invention is shown in profile in FIG. 1 and in cross-section in FIG. 2. As best seen in FIG. 2, the gasket 45 is a two-component annular, ring-shaped member having a main gasket body, or first component, 55 formed of a flexible elastomeric material, such as a suitable natural, synthetic elastic, or TPV or TPE. The elastomeric material used to form the body 55 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), other nitrile rubbers, VITON or other chemical resistant material, as well as TPE's or TPV's etc. The durometer of the elastomer used for the main gasket body may vary depending on the end application but will typically be in the range from about 40-70 Shore A hardness, preferably about 45-60 Shore A.

As can be seen in FIG. 2, the gasket 45 also has a second component 57 which is formed of a synthetic plastic type material having a durometer which is greater than the durometer of the main body 55 portion of the gasket. The band can have a higher durometer than the remaining main body portion of the gasket since it does not participate in the sealing function of the gasket to the same extent as the primary sealing region of the gasket. For reasons which will be explained, the relatively hard plastic component 57 of the gasket is not required to have a melting temperature high enough to withstand the temperatures of the gasket molding process (higher than the melting point of the rubber body portion). As a result, it can be a less expensive formulation.

Various hard plastic type materials may be suitable candidates for use as the hard plastic band. These materials include such materials as the polyolefins such as polyethylene, polypropylene and other common plastics, such as polyvinylchloride, PET, PBT, polyamide, their glass filled version or recycled version of such common thermoplastics. It is not generally necessary to use a more exotic material, such as one of the various "engineered plastics," for example, the modified polyphenylene ethers (PPE), Polysulphones or Poly ethyl ether ketones (PEEK) and the like. These commercially available materials have high heat resistance, making them suitable for injection or compression molding temperatures and are generally suitable for plastic/rubber composites. However, in the process of manufacture of the invention, the rubber portion 55 and hard plastic portion 57 of the gasket are separately molded and then later joined together to form an assembled gasket. As a result, a less expensive plastic material can be used for the plastic component 57 of the gasket.

While not intended to be limiting in any sense, the following are characteristics of one set of actual materials used in forming a prototype gasket of the invention:

Generic 50 Shore A Elastomeric Material for the Rubber Component 55:
  Relatively soft material recommended for non-pressure applications
  Modeled as hyperelastic
  More compatible with relatively low modulus of the plastic portion 57
  Density p=1.1 g/cm$^3$
  Neo-Hooke modulus $C_{10}$=0.4261 MPa
  Compressibility D1=0.002 mm$^2$/N Glass Reinforced Polypropylene for the Hard Plastic Component 57:
  Modeled as linear elastic
  Density p=1.12 g/cm$^3$
  Elastic modulus E=5200 MPa
  Tensile Stress (break) $S_u$=40 MPa
  Tensile Elongation (break) $\varepsilon_u$=5.0%

With reference again to FIG. 2, the sealing gasket of the invention can be seen to be a ring shaped composite elastomeric body which, when viewed in cross section, has a leading region formed of a rubber/elastic material 55 and which has a trailing region 57 which is formed of a synthetic plastic type material. The leading region has an outer circumferential surface 59 which contacts the pipe groove 43 and an inner circumferential primary compression sealing surface 61 which forms a compression seal with the exterior surface of the mating male pipe when the mating male pipe is inserted within the socket end of the thermoplastic pipe to form a pipe joint. The rubber portion also has an internal groove region made up of a vertical pocket section 62 and a horizontal pocket section 63.

The mating hard plastic component 57 has a trailing circumferential body portion 65, the exterior surface of which forms an approximate 35° angle in the example shown with respect to the central longitudinal axis of the pipe. The shape and angle of this portion of the gasket allows the hard plastic portion to function as a belling ramp for the heated plastic pipe end 47, during the belling operation. As mentioned, the preferred material for the hard plastic portion can conveniently be a polypropylene material PET or polyamide, such as glass reinforced polypropylene, PET, or polyamide, a high performance impact polymer showing an appropriate stiffness for the application at hand. Also, as has been mentioned, the material can be of higher durometer than the remaining portion of the gasket body since it does not participate in the sealing function of the gasket to any significant extent.

The hard plastic portion of the gasket can thus include recycled plastics, as well as a wide range of other plastics. In running simulations of the sensitivity of candidate plastics with variations in elastic modulus, it appears that a range of thermoplastics are acceptable candidates, as long as the modulus is above about 3000 MPa with tensile strengths about 40 MPa. Structural behavior appears to start to deteriorate more significantly below 3000 MPa. It might be possible to complete belling with even a lower elastic modulus, but it would be expected to become more difficult in practice and more sensitive to variations. The critical stage is when the gasket is loading onto the belling mandrel, with the mandrel pushing out against the lip of the gasket, with the gasket tail hanging in the air. Choosing a larger elastic modulus material, however, leads to concerns that the material might become more brittle, which could easily break in abnormal situations.

As is evident from FIG. 2, the sealing gasket 45 is thus a two component gasket having a elastic circumferential portion 55 and a plastic circumferential portion 57. However, as mentioned in the Background discussion, while prior art two component gaskets have been used in the past, the present gasket has two dissimilar portions which are not permanently or semi-permanently joined, as by bonding, gluing with an adhesive, etc. Rather, the two component gasket of the invention has discrete components which are molded separately and then assembled together, as by stretching the elastic portion of the gasket over a region of the plastic portion, prior to installing the sealing gasket on the forming mandrel. While the components are preferably injection molded, it is also possible that the rubber component could be extruded with the ends being subsequently joined, in some circumstances.

The exterior surface of the hard plastic component 57 forms a channel region 67 in the direction of the leading edge 69. The channel region 67 receives an elastic anchor region 72 of the elastic component 55 so that there is moderate lateral interference on the anchor region 72 when the two components are assembled together, as shown in FIG. 2. In one example prototype design, the width of the channel region 67 is 3.0 mm where the lip (anchor region 72) of the elastic portion is approximately 3.2 mm. Thus, in the example, the lateral interference or compression of the elastomer lip is about 6.0%. Generally, it will be in the range from about 5 to 10%. The lateral interference might need to be increased to improve stability, depending upon the application, e.g., whether the joint in question is a low pressure joint or relatively high pressure joint. The interference channel might also be modified to produce a snap-fit effect with the elastic anchor region 72.

This design forms a "rubber anchor" for the elastic component and prevents it from rising when the lip is bent or pulled. This also keeps the softened female socket pipe end from clashing with the elastomer as it is formed over the seal. The hard plastic portion continues in the direction of the leading edge 69 to form a stepped plastic-elastic interface profile, shown generally as 71 in FIG. 2. This stepped region or interface profile improves stability of the elastomer stretched over the plastic.

As also shown in FIG. 2, there is space (indicated generally at 68 under the plastic ring which leaves enough room to conceal the lip of the elastic component as the seal slides over the forming mandrel, while still ensuring enough compression to seal against the female spigot outer diameter. The tail internal diameter (70 in FIG. 2) is intended to rest on the forming mandrel outer diameter in a retention groove, but can also remain compatible with resting on the remaining outer diameter.

Figure 7:
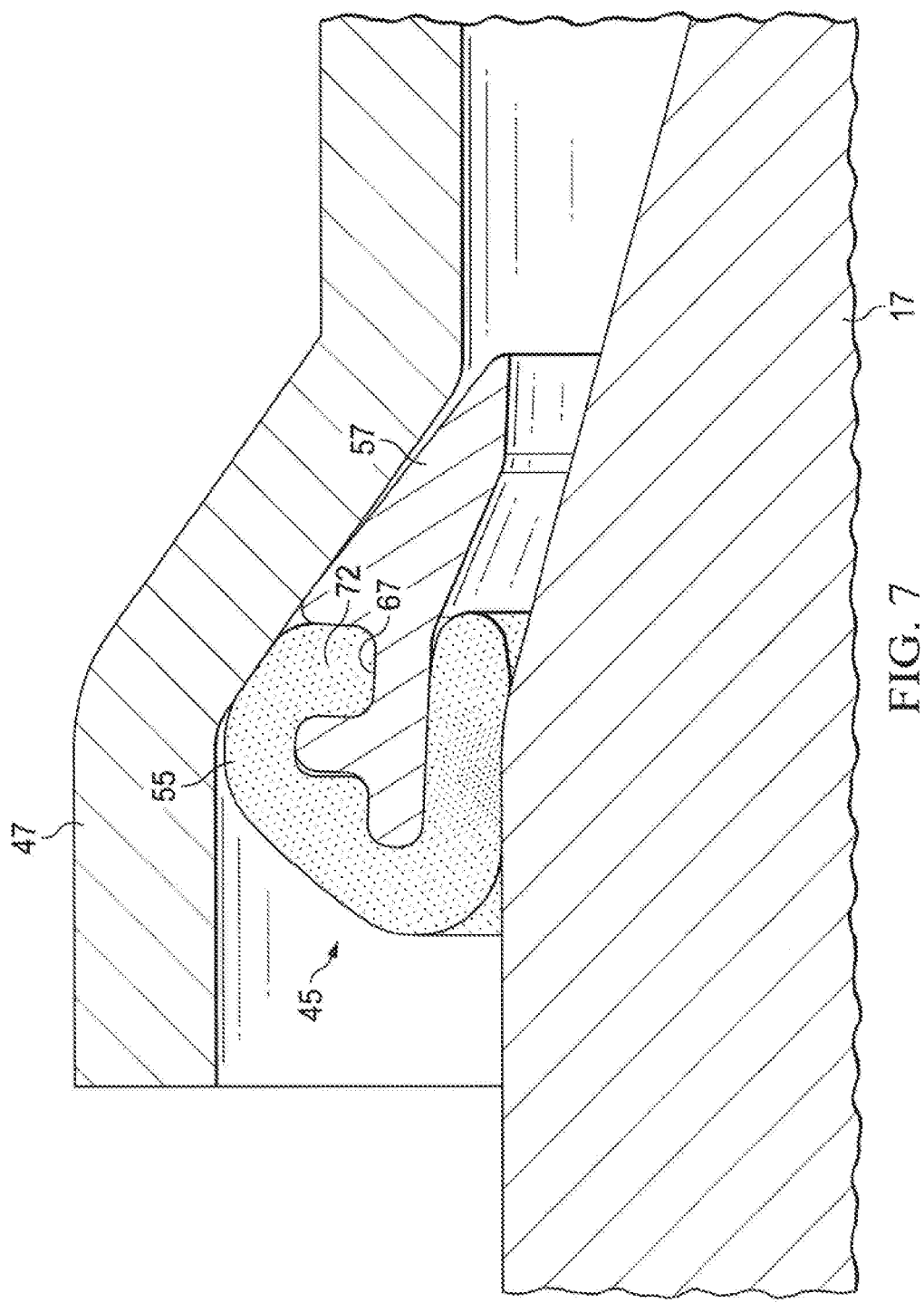
FIG. 7 is an FEA plot of gasket of the invention in place on the belling mandrel showing the simulated deformed geometry at the critical condition loading.

FIG. 2 is also intended to show the simulated deformed geometry of the gasket before loading, which is the initial condition of the belling simulation illustrated in the remaining FIGS. 7-14 and shows a slight elastic stretch for assembly with the plastic portion of the gasket. The elastic anchor region (shown as 72 in FIG. 2) must be moderately squeezed to fit in the channel 67 of the plastic component 57. FIG. 7 shows the simulated deformed geometry at the critical condition loading with the area of increased stress shown by increased shading. There is less tendency to rotate than with certain of the prior designs due to the reduction in seal compression under the larger ID of the plastic retainer.

Figure 8:
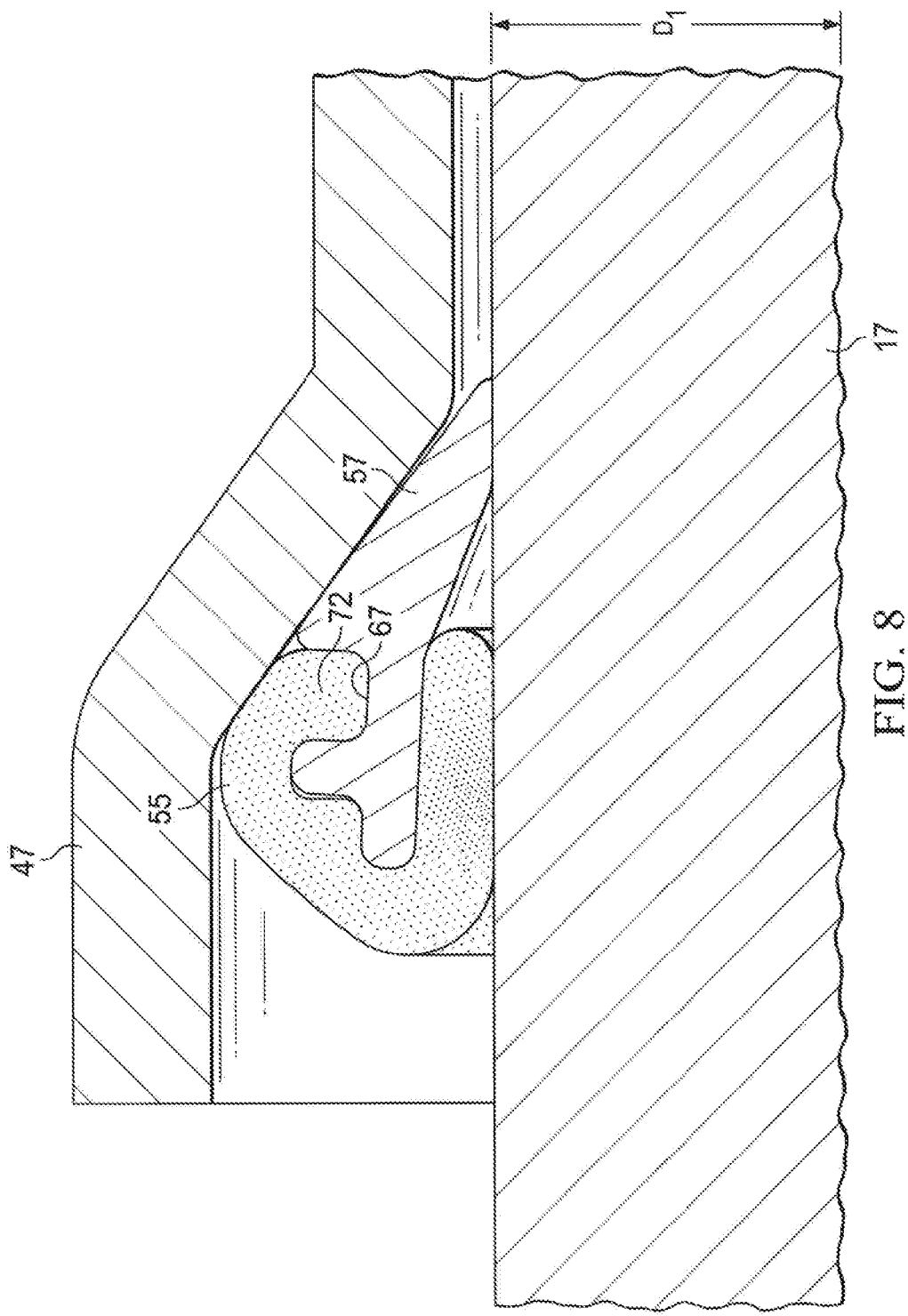
FIG. 8 is a view similar to FIG. 7, but showing the deformed geometry of the gasket as it slides on one region, D1, of the belling mandrel.
Figure 9:
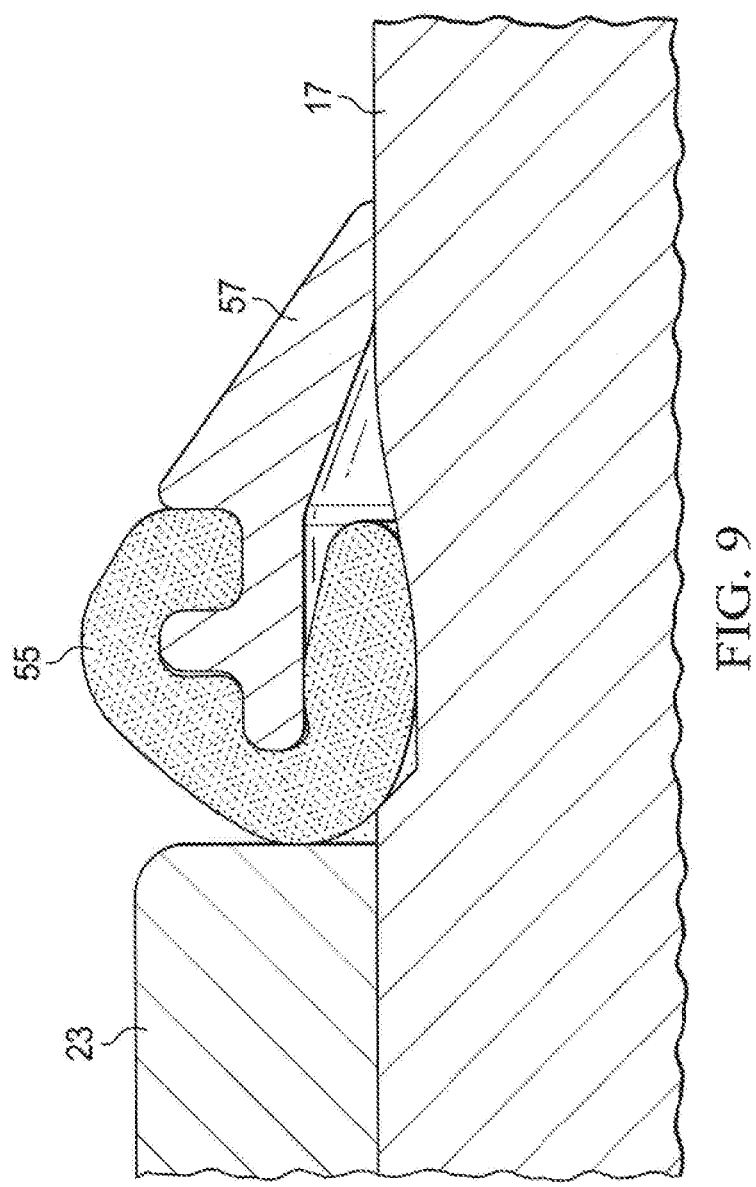
FIG. 9 is another view of the FEA analysis, but showing the deformed geometry of the gasket after loading on the belling mandrel with the gasket shown in position against the back-up collar of the belling mandrel.
Figure 10:
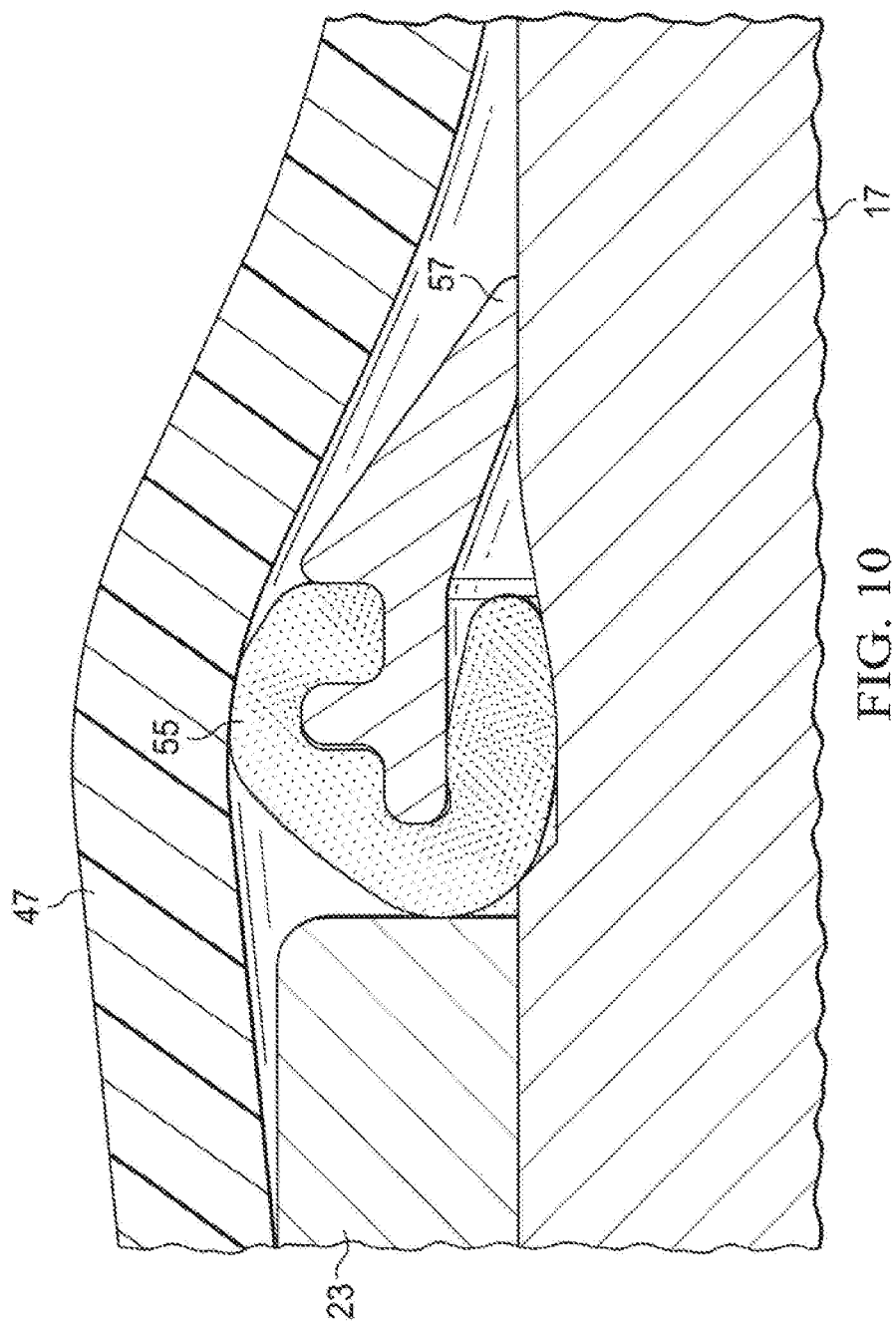
FIG. 10 shows the strain after the heated, female pipe end is pushed over the gasket during the pipe belling process.

FIG. 8 shows the simulated deformed geometry on the gasket as it is sliding on the forming mandrel outer diameter D1. There is a moderate rubber strain. FIG. 9 shows the simulated deformed geometry on the gasket after loading. The gasket presents an excellent belling position on the loading mandrel. The plastic component prevents the seal apex from sticking out. FIG. 10 of the simulation shows the deformed geometry after pushing the female bell socket pipe end over the sealing gasket. The bell pipe end slides smoothly over the seal, near its intended raceway ID.

Figure 11:
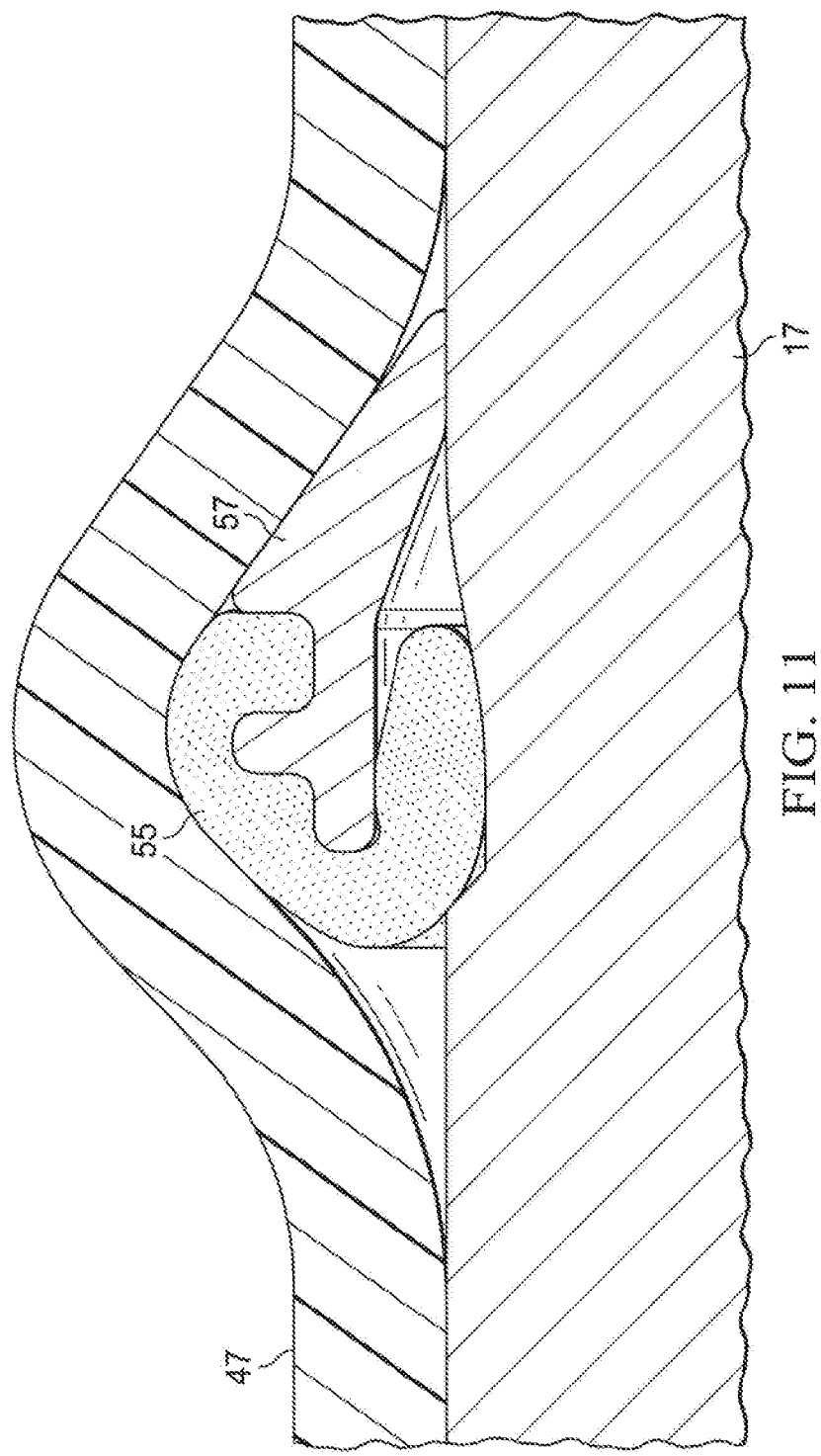
FIG. 11 shows the gasket deformed geometry after the application of vacuum and partial shrinkage during the belling process.
Figure 12:
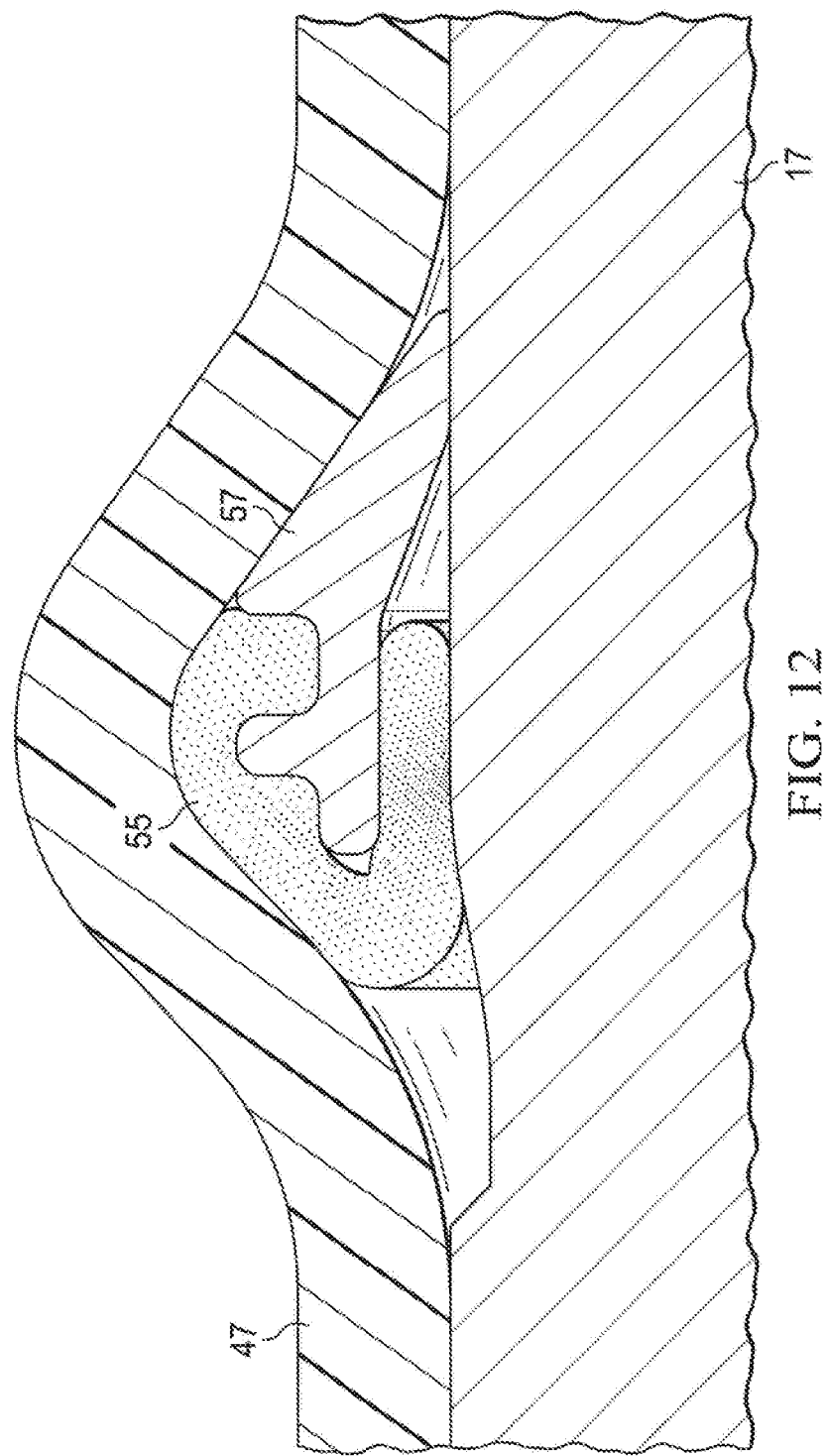
FIG. 12 shows the gasket deformed geometry as the gasket is being pulled out of the belling mandrel.
Figure 13:
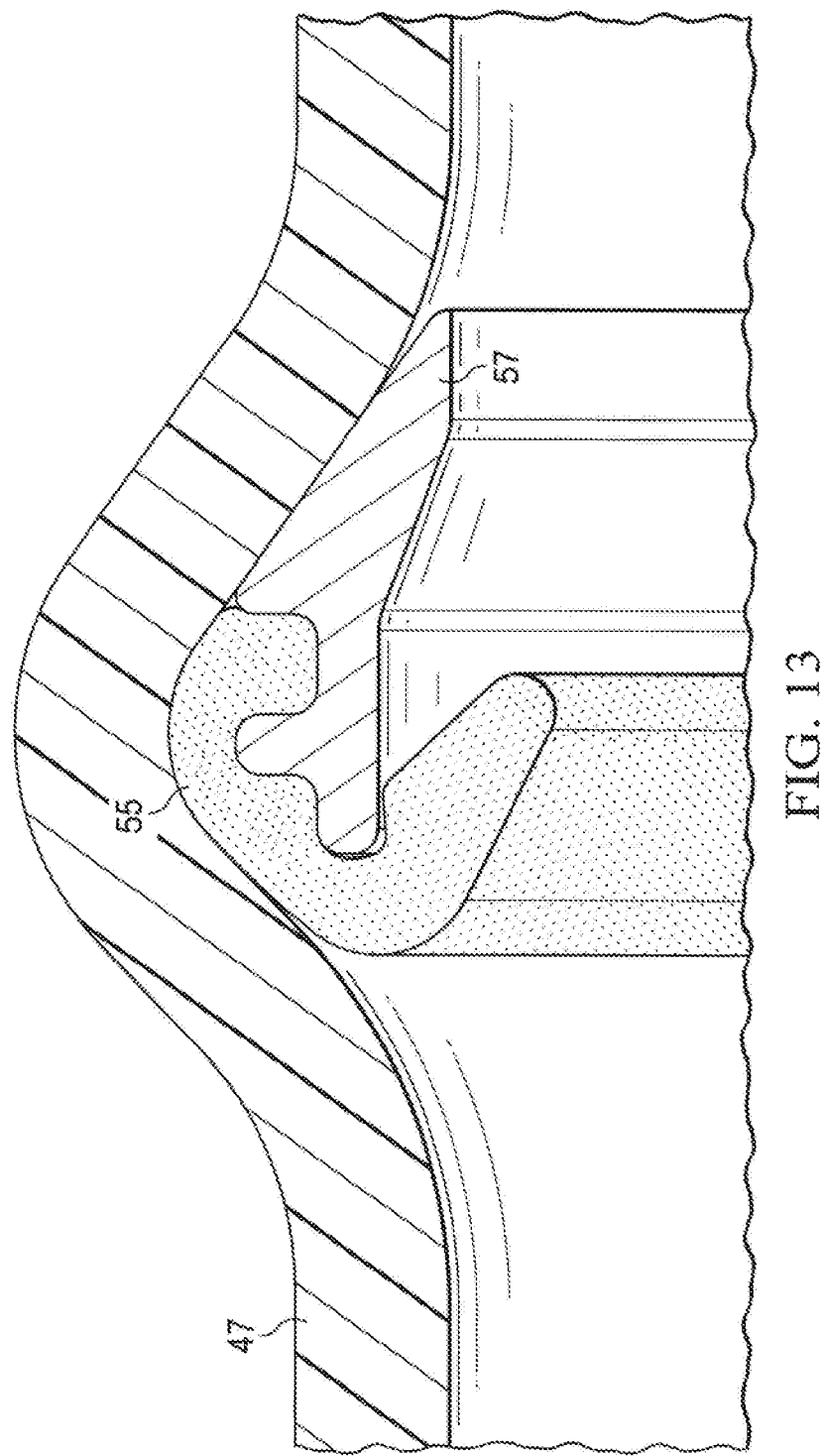
FIG. 13 shows the gasket deformed geometry at the final pipe socket shape.
Figure 14:
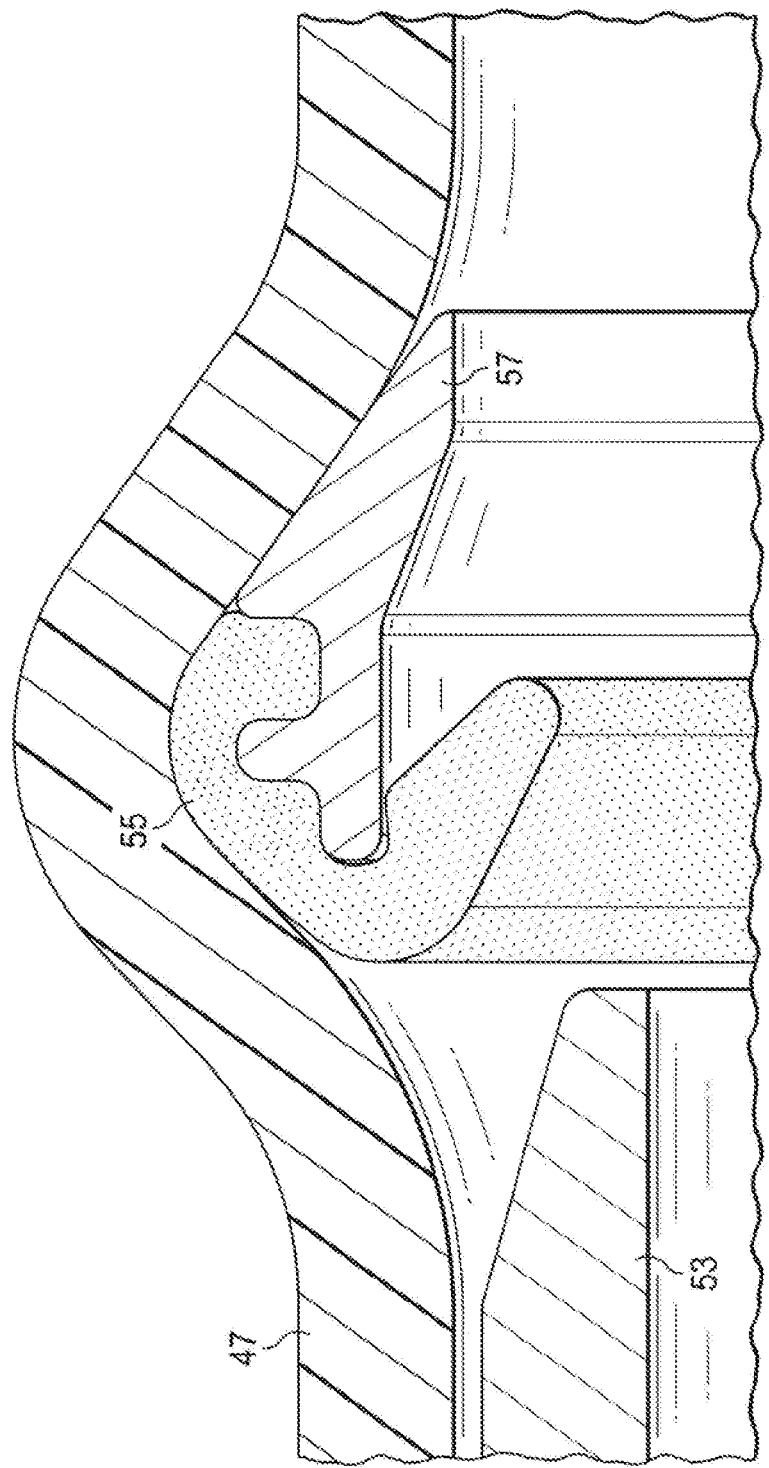
FIG. 14 shows the deformed geometry on the gasket after joint assembly.

FIG. 11 shows the simulated deformed geometry of the gasket after vacuum and partial shrinkage. The simulation shows excellent raceway drop in front of the sealing gasket. This behavior is expected to provide good support in possible pressure applications for the gasket. FIG. 12 shows the deformed geometry that occurs upon pulling the forming mandrel out. FIG. 13 shows the sealing gasket deformed geometry at the final socket shape. This is an excellent resulting socket shape. Finally, FIG. 14 shows the simulated deformed geometry after the pipe joint assembly with the male, spigot pipe end 53. There is moderate deformation and good sealing action.

Figure 15:
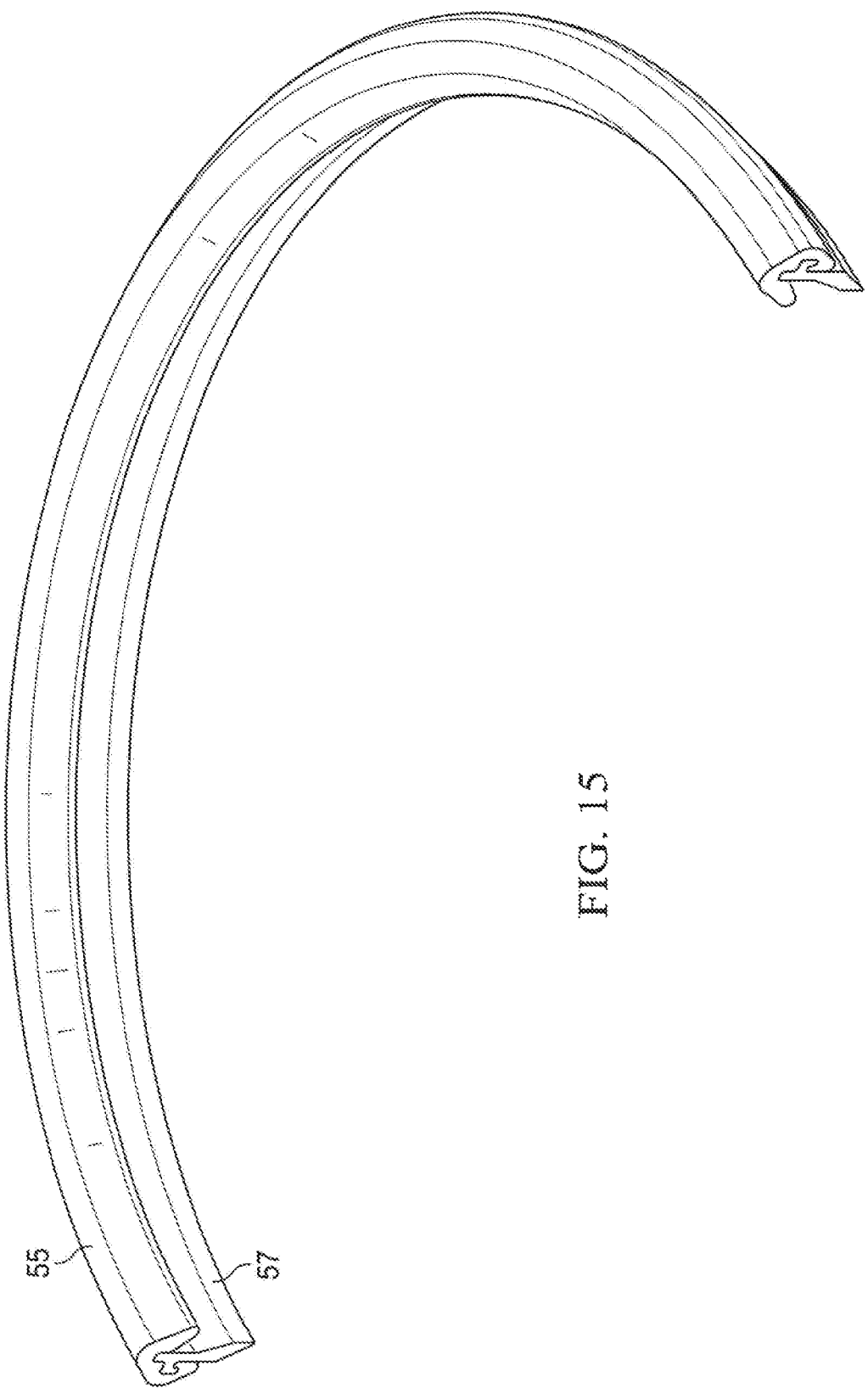
FIG. 15 is a partial perspective view of the assembled gasket of FIGS. 1-2 and 7-14.
Figure 16:
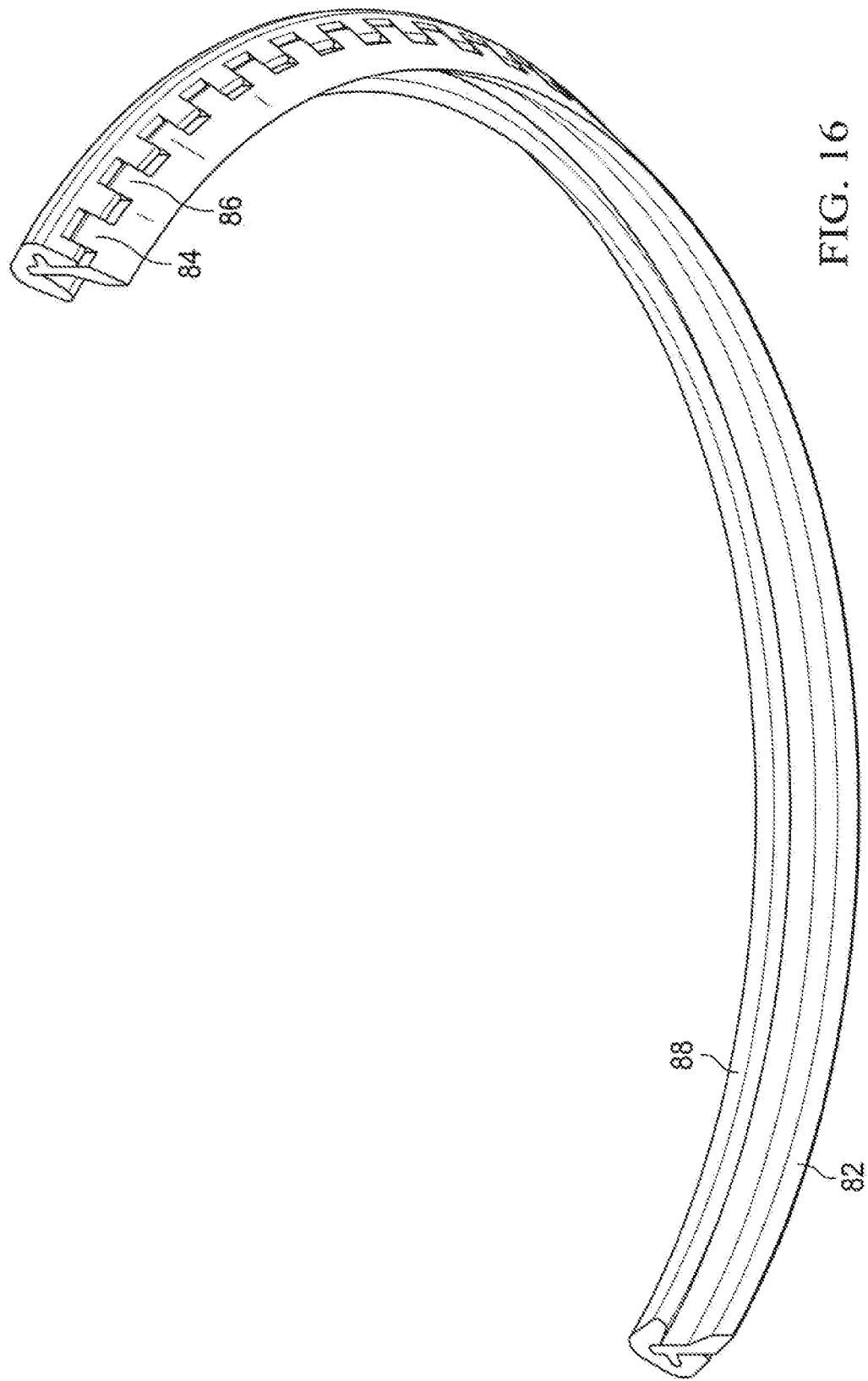
FIG. 16 is a partial perspective view of an alternative gasket of the invention.

In addition to the exemplary shapes for the elastic component and plastic component of the gasket shown in FIGS. 1-2 and 7-14, it is possible that the two portions of the gasket may assume different shapes in practice. For example, FIG. 15 shows the exemplary assembled gasket of FIGS. 1-2 and 7-14 where the plastic component 57 fits within a continuous channel formed in the elastomer portion 55. An alternative design is shown in FIG. 16 in which the plastic component 82 is formed with alternating posts or protrusions which form a tooth-like pattern around the ring, see, e.g., protrusions 84, 86. The protrusions are received within mating recesses in the elastomer component 88. Thus, in this design alternative, the plastic component fits within a discontinuous channel region of the elastomer component, the channel being interrupted by the posts or protrusions 84, 86. While this design is somewhat more complicated, it presents the possibility of allowing the use of a plastic mold which could be a simple two-plate mold, rather than requiring a mold with plates which open sideways.

An invention has been provided with several advantages. An essentially belled in place gasket that is also recyclable is a distinct advantage in many instances. The gasket will be stiff and yet be flexible enough to withstand belling, but also be removable once the pipe belling operation is complete. For example, it might be convenient to replace a more common rubber component of the gasket with a gas and oil resistant rubber formulation in some circumstances of use.

The use of two discrete gasket components allows the use of less exotic plastic materials and saves costs. The elastic and plastic components of the sealing gasket can be taken apart prior to being placed on the forming mandrel to allow substitution of gasket components formed of different materials. The hard plastic component of the sealing gasket acts as a belling ramp to deform the pipe socket end of the female thermoplastic pipe to thereby integrally lock the sealing gasket within the subsequently formed retention groove in the pipe socket end after belling.

The plastic component and Rubber or TPE/TPV components allow separation of the two essential parts of the gasket with concomitant replaceability of the elastic component and recyclability, and are not limited to adhesively compatible materials. Unlike normal bonded olefin-EPDM elastomer or TPV/TPE gaskets, the two components due to the unique design characteristics, do not need to be adhesively compatible.

The use of a sealing gasket with a plastic retainer, rather than using steel, avoids leaving metal parts in the ground over time. Because the parts are held together by a stretch-fit, compatibility of various plastic and elastomeric formulations for bonding purposes is not necessary. Mechanical interlocking is also not required, as in over-molding techniques where rubber is flowed through opening in the plastic part during manufacture. The 35° angle of the tail of the plastic insert makes it compatible with the existing sewer gasket belling loaders. For pressure applications, a 30° angle would generally be compatible with the belling loaders used. The gasket of the invention presents generally thinner retainer which provides more of a gap space between the retainer ID and the forming mandrel at the D1 position. The sealing gasket is intended to take advantages of improvements in forming mandrel design, while remaining compatible with existing mandrels.

The new design exhibits a dramatic increase in plastic volume compared to other presently used seal designs. The less expensive plastic can be, for example, a polypropylene, PET, Polyamide, or recycled version of any plastic with less than 30% glass fiber. The material selection is intended to achieve around 4000 MPa modulus while avoiding brittle behavior (ultimate strain greater than 5%). The design also consequently exhibits a dramatic reduction in the elastomer volume as compared to other seals of this general type. The volume of elastomer used is significantly lower than current sewer sealing gaskets with steel ring retainers.

While the invention has been shown in only two of its forms, it is not thus limited but is susceptible to various changes and modifications without departing from the spirit thereof, as described in the claims which follow.

What is claimed is:

1. A method of installing a gasket in a socket end of a female thermoplastic pipe, the socket end being sized to matingly engage a spigot end of a mating male thermoplastic pipe to form a pipeline, the method comprising the steps of:
   providing a forming mandrel having an inner end and an outer end and having an outer working surface;
   installing a sealing gasket at a first circumferential location on the outer working surface;
   heating the socket end of the female thermoplastic pipe;
   forcing the heated socket end of the female thermoplastic pipe over the working surface of the mandrel and over the sealing gasket, whereby the heated socket end of the thermoplastic pipe flows over the sealing gasket to form a retention groove for retaining the sealing gasket;
   allowing the heated socket end of the thermoplastic pipe to cool;
   thereafter, retracting the cooled socket end of the thermoplastic pipe and the retained sealing gasket from the working surface of the mandrel;
   wherein the sealing gasket is a two component gasket having an elastic circumferential component and a plastic circumferential component, the two components being molded separately and then assembled together by stretching the elastic circumferential component over at least a portion of the plastic circumferential component, prior to installing the sealing gasket on the forming mandrel and installing the assembled two component gasket onto the forming mandrel; and
   wherein the plastic circumferential component of the sealing gasket acts as a belling ramp for the female thermoplastic pipe as the female thermoplastic pipe is forced over the working surface of the mandrel and over the sealing gasket in a subsequent belling operation.

2. The method of claim 1, wherein the elastic circumferential component of the two component gasket is formed of a rubber selected from the group consisting of styrene butadiene rubber, EPDM, nitrile rubber, Viton or fluorocarbon, TPE, or TPV.

3. The method of claim 1, wherein the plastic circumferential component of the gasket is formed of a thermoplastic.

4. The method of claim 1, wherein the plastic circumferential component of the gasket is formed of a synthetic material selected from the group consisting of polyethylene, polypropylene, PET, PBT, Polyamide, their glass filled versions, and recycled versions.

5. The method of claim 1, wherein the elastic circumferential component of the sealing gasket has an outer circumferential region which forms a seal with the groove provided in the female thermoplastic pipe and a downwardly extending lip region which forms a seal with the mating male thermoplastic pipe.

6. The method of claim 5, wherein the plastic circumferential component of the gasket has an outer circumferential surface which aligns with the outer circumferential region of the elastic circumferential component, the plastic component assisting in retaining the elastic circumferential component during belling and being received within the female pipe groove after assembly to help retain the gasket in the groove during use.

7. The method of claim 6, wherein the plastic circumferential component of the gasket has a trailing external raceway which circumscribes the plastic circumferential component and which receives a portion of the elastic component when the elastic and plastic circumferential components are assembled to form the sealing gasket.

8. The method of claim 7, wherein the elastic circumferential component has an elastic anchor region which is received in the trailing external raceway which is formed in the elastic component, the elastic anchor region being squeezed laterally in the raceway after assembly, causing lateral interference or compression of the elastic anchor region.

9. The method of claim 8, wherein the lateral compression or interference is approximately 6%.

10. The method of claim 1, wherein the elastic circumferential component of the sealing is stretch-fit over the plastic circumferential component without bonding or gluing.

11. The method of claim 1, wherein the elastic and plastic circumferential components of the sealing gasket can be taken apart prior to being placed on the forming mandrel to allow substitution of gasket components formed of different materials.

12. The method of claim 1, wherein, as the socket end of the female thermoplastic pipe is heated, and forced over the sealing gasket on the forming mandrel, that the hard plastic circumferential component of the sealing gasket acts to deform the pipe socket end of the female thermoplastic pipe to thereby integrally lock the sealing gasket within the subsequently formed retention groove in the pipe socket end.

13. The method of claim 1, further comprising the steps of: providing a backup collar at a second circumferential location on the forming mandrel, the backup collar having an exposed lip component which initially abuts the sealing gasket to retain the sealing gasket at the first circumferential location, the backup collar being retracted once the heated thermoplastic pipe end is forced over the forming mandrel and the sealing gasket.

14. The method of claim 13, further comprising the step of applying a vacuum or positive external pressure to the heated, socket end of the thermoplastic pipe after the pipe has been forced over the working surface of the mandrel and over the trailing region of the sealing gasket and mandrel to thereby force the heated, socket end to contract about the mandrel and sealing gasket.

15. A method of installing a gasket in a socket end of a female thermoplastic pipe, the socket end being sized to matingly engage a spigot end of a mating male thermoplastic pipe to form a pipeline, the method comprising the steps of:
   providing a forming mandrel having an inner end and an outer end and having an outer working surface;
   installing a sealing gasket at a first circumferential location on the outer working surface;
   heating the socket end of the female thermoplastic pipe;

forcing the heated socket end of the female thermoplastic pipe over the working surface of the mandrel and over the sealing gasket, whereby the heated socket end of the thermoplastic pipe flows over the sealing gasket to form a retention groove for retaining the sealing gasket;

allowing the heated socket end of the thermoplastic pipe to cool;

retracting the cooled socket end of the thermoplastic pipe and the retained sealing gasket from the working surface of the mandrel;

wherein the sealing gasket is a two component gasket having an elastic circumferential component formed of an elastomeric material having a hardness in the range from about 40-60 Shore A and a plastic circumferential component formed of a material selected from the group consisting of polypropylene, PET, PBT, polyamide synthetic plastics and their glass filled or recycled forms, the two components of the gasket being molded separately and then assembled together by stretching the elastic circumferential component over at least a portion of the plastic circumferential component, prior to installing the sealing gasket on the forming mandrel and installing the assembled two component gasket onto the forming mandrel; and wherein the plastic circumferential component of the sealing gasket acts as a belling ramp for the female thermoplastic pipe as the female thermoplastic pipe is forced over the working surface of the mandrel and over the sealing gasket in a subsequent belling operation.

16. The method of claim 15, wherein a previously installed belled-over gasket is subsequently removed from the retention groove and replaced with a different gasket.

* * * * *